(12) United States Patent
D'Alessio et al.

(10) Patent No.: US 8,712,326 B2
(45) Date of Patent: Apr. 29, 2014

(54) INTEGRATED PROJECTOR SYSTEM

(75) Inventors: Samuel Nicklaus D'Alessio, Round Rock, TX (US); Kurt Heggland, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 713 days.

(21) Appl. No.: 12/651,202

(22) Filed: Dec. 31, 2009

(65) Prior Publication Data

US 2011/0157484 A1    Jun. 30, 2011

(51) Int. Cl.
*H04B 7/00* (2006.01)
(52) U.S. Cl.
USPC ............ 455/41.2; 353/60; 353/122; 353/101; 710/303; 348/744
(58) Field of Classification Search
USPC ....................................... 455/41.2
See application file for complete search history.

(56) References Cited

U.S. PATENT DOCUMENTS

| | | | |
|---|---|---|---|
| 6,909,406 B2 | 6/2005 | Wilburn et al. | |
| 7,317,955 B2* | 1/2008 | McGreevy | 700/83 |
| 7,500,758 B1* | 3/2009 | Adachi et al. | 353/101 |
| 2003/0002016 A1* | 1/2003 | Sellen et al. | 353/31 |
| 2005/0028965 A1* | 2/2005 | Chen | 165/104.21 |
| 2005/0240417 A1* | 10/2005 | Savage | 705/1 |
| 2006/0256144 A1 | 11/2006 | Chung | |
| 2007/0177115 A1 | 8/2007 | Yin et al. | |
| 2007/0268462 A1* | 11/2007 | Shih et al. | 353/60 |
| 2007/0273848 A1 | 11/2007 | Fan et al. | |
| 2008/0297520 A1 | 12/2008 | Montag | |
| 2009/0185147 A1 | 7/2009 | Alaganchetty et al. | |
| 2010/0057969 A1* | 3/2010 | Meiri et al. | 710/303 |
| 2010/0302141 A1* | 12/2010 | Shankar et al. | 345/156 |
| 2011/0134300 A1* | 6/2011 | Chung | 348/333.01 |

* cited by examiner

*Primary Examiner* — David Bilodeau
(74) *Attorney, Agent, or Firm* — Larson Newman, LLP

(57) ABSTRACT

A projector includes a first serial advanced technology attachment connector, a latch, a switch, and a communication module. The first serial advanced technology attachment connector is configured to connect with a second serial advanced technology attachment connector located within a computer. The latch is configured to extend from the projector and to disconnect the first serial advanced technology attachment connector from the second serial advanced technology attachment connector. The switch is in communication with the latch, and is configured to close when the latch is extended. The communication module is in communication with the switch and with the first serial advanced technology attachment connector. The communication module is configured to provide power to a radio link, to initiate communication with the computer via the radio link, to receive an image from the computer, and to display the image.

15 Claims, 5 Drawing Sheets

INTEGRATED PROJECTOR SYSTEM

FIELD OF THE DISCLOSURE

This disclosure relates generally to information handling systems, and more particularly relates to an integrated projector system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Presentations are often given using a projector to project an image from an information handling system to a screen or wall in a size large enough for the audience to view. A computer can communicate with the projector to output images associated with a display screen of the computer. The communication between the computer and the projector can be through a wired or wireless connection controlled by software installed on the computer.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
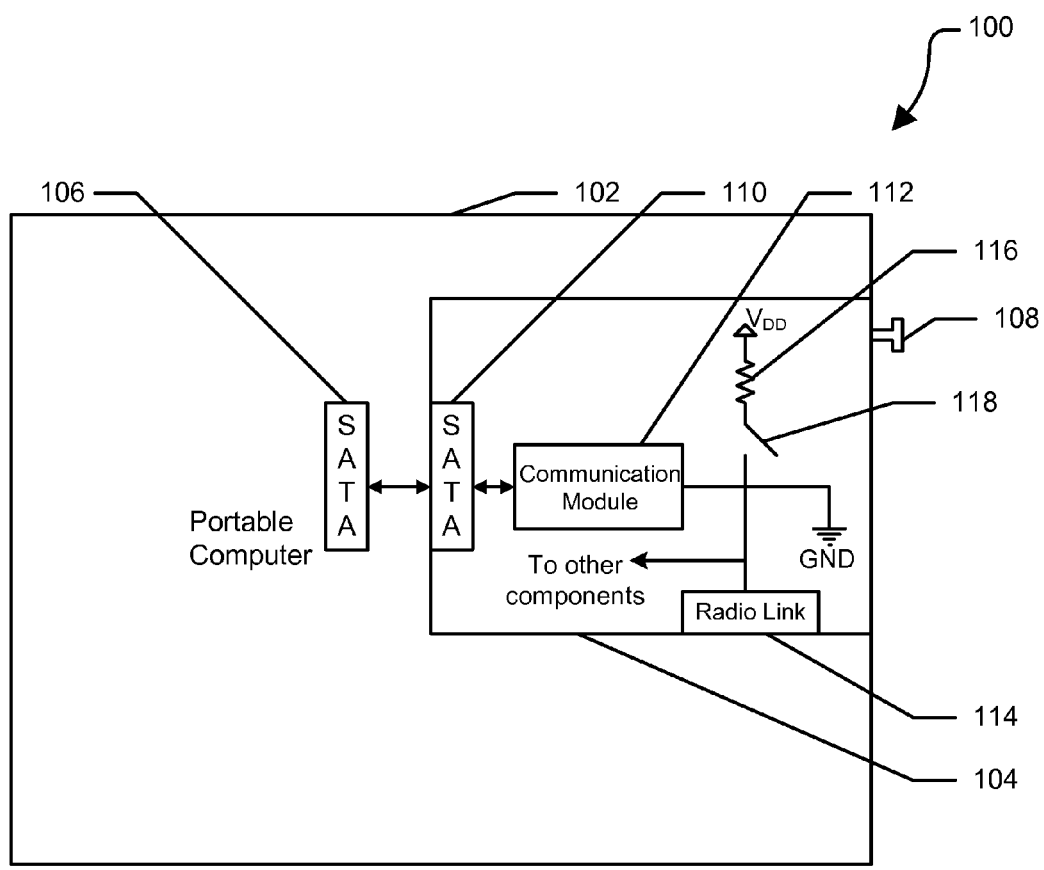
FIG. 1 is block diagram of a computer and an integrated projector.

FIG. 1 shows a projector system 100 of an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The projector system 100 includes a computer 102 and an integrated projector 104. The computer 102 includes a serial advance technology attachment (SATA) connector 106. The integrated projector 104 includes a SATA connector 110, a communication module 112, a radio link 114, a resistor 116, and a switch 118. The integrated projector 104 can be placed in physical communication with the computer 102 by inserting the projector within the computer. The SATA connector 106 can be in communication with the SATA connector 110, which in turn is in communication with the communication module 112. The communication module 112 is in communication with the radio link 114, with a first terminal of the resistor 116, and with a first terminal of the switch 118. The resistor 116 includes the first terminal and a second terminal connected to a first reference voltage, labeled $V_{DD}$. The first voltage reference can be a battery within the integrated projector 104. The battery $V_{DD}$ can be in communication with the SATA connector 110 so that the battery can be charged via power received from the SATA connector while the integrated projector 104 is stored within the computer 102. The switch 118 includes the first terminal and a second terminal connected to a second reference voltage, labeled GND.

Figure 2:
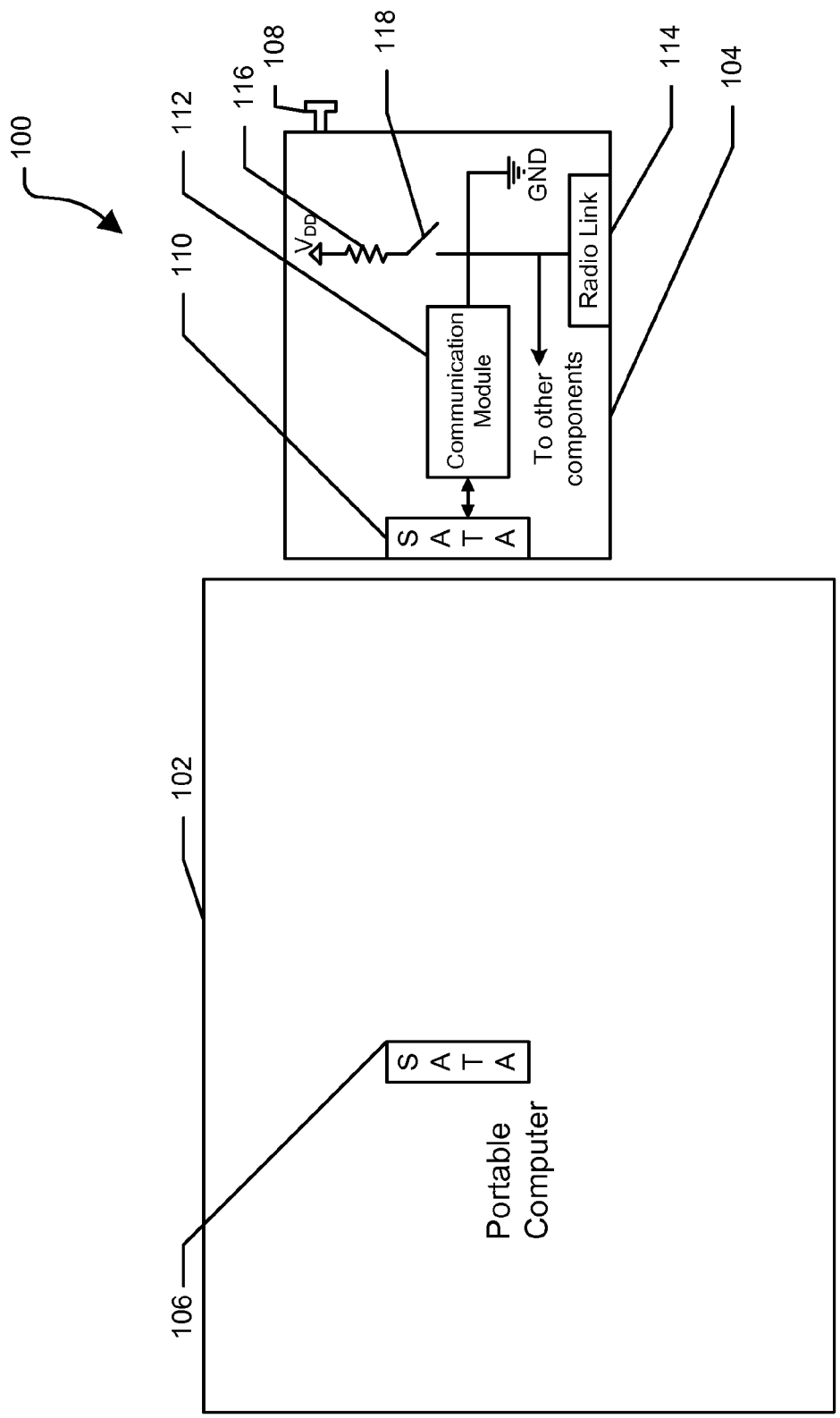
FIG. 2 is another block diagram of the computer and the integrated projector.

The latch 108 can release and extend from the integrated projector 104, so that a user can remove the integrated projector from the computer 102. The user of the computer 102 and the integrated projector 104 can then pull on the extended latch 108 to remove the integrated projector from the computer as shown in FIG. 2. Additionally, when the latch 108 is extended from the integrated projector 104, a signal is sent to the switch 118. In response to receiving the signal, the switch 118 can close so that the switch can provide a connection between the resistor 116 and the communication module 112, and between the resistor and the radio link 114. The switch 118 also can provide a connection between the resistor 116 and the other components of the integrated projector 104. Thus, when the switch 118 is closed, the resistor 118 and the first voltage reference $V_{DD}$ can provide power to the communication module 112, to the radio link 114, and to the other components in the integrated projector 104. Thus, the integrated projector 104 can be powered on as the switch 118 connects the components within the integrated projector with the resistor and the first reference voltage.

When the communication module 112 is powered on, the communication module can wait for the integrated projector 104 to be removed from the computer 102. The communication module 112 can detect that the integrated projector 104 is being removed from the computer 102 by receiving a signal that the SATA connector 110 has been disconnected from the SATA connector 106. The communication module 112 can then send a communication signal to the radio link 114 to be broadcast from the integrated projector 104. The communication signal can be a request to initiate communication with a computer located with the broadcast range of the communication signal. The radio link 114 can communicate via a Wireless-Fidelity (WiFi) link, a Bluetooth link, or the like.

The broadcast signal can be received by the computer 102, and the computer can send a return signal to the integrated projector 104. When the computer 102 and the integrated projector 104 each receive a signal from the other device, the computer and integrated projector can then initiate a communication session to send images from the computer to the integrated projector for display.

The radio link 114 can receive signals from the computer 102 and can send the signals to communication module 112 so that the communication module can perform different functions on the signals. The signals can include digital images, audio, data, or the like that the computer 102 can transmit to the integrated projector 104. Thus, when the integrated projector 104 is removed from the computer 102, a communication session can be automatically initiated so that the integrated projector can receive the signals for images to be displayed from the computer 102. The integrated projector 104 can output the images from the computer 102 via a lens 302 as shown in FIG. 3.

Figure 3:
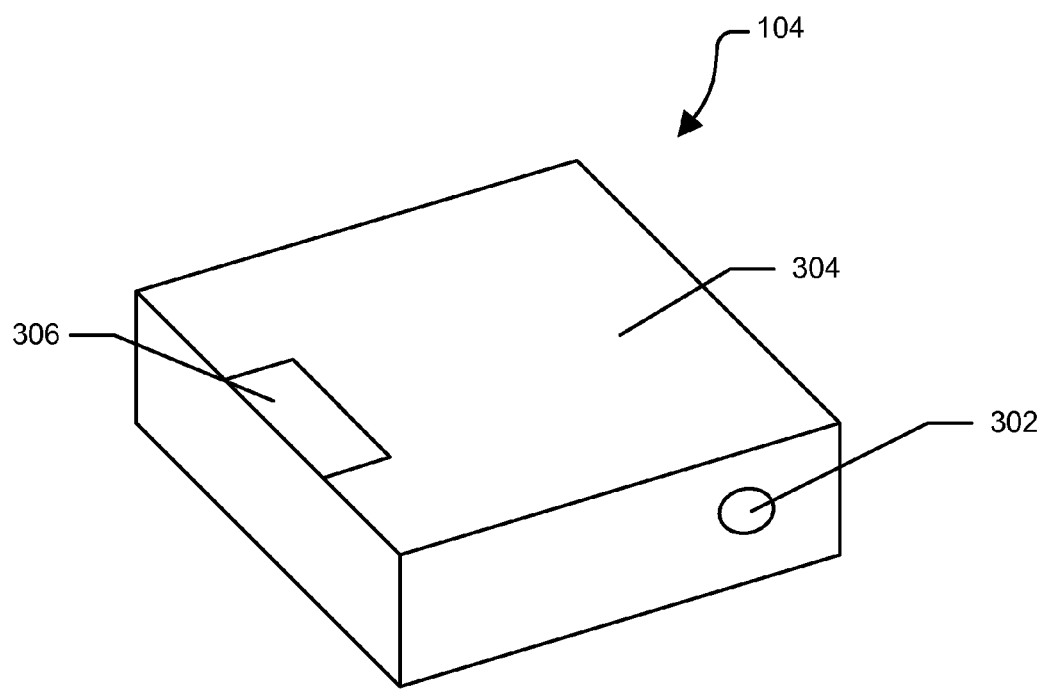
FIG. 3 is a schematic diagram of the integrated projector.

FIG. 3 shows a schematic diagram of the integrated projector 104 including the lens 302, a cover 304, and a communication cover 306. The lens 302 is in physical communication with the cover 304, such that the lens is located within a cut-out of the cover. The cover 304 is in physical communication with the communication cover 306. The lens 302 can project the images received from the computer 102 on a wall, a screen, or the like. The projection of the image can be via a laser projection, a light projection, or the like.

The cover 304 is preferably metal and/or another material that conducts heat. The cover 304 can be connected to a heat sink of the integrated projector 104, such that the cover can enhance the dissipation of the heat generated by the components of the integrated projector. The cover 304 can enhance the heat dissipation via the large surface area of the cover and the flow of ambient air over the cover. The communication cover 306 is preferably plastic or another material that does not interfere with the communication between the computer 102 and the integrated projector 104. Thus, the communication cover 306 can enable the radio link 114 to send and receive signals without having interference caused by the cover 304.

Figure 4:
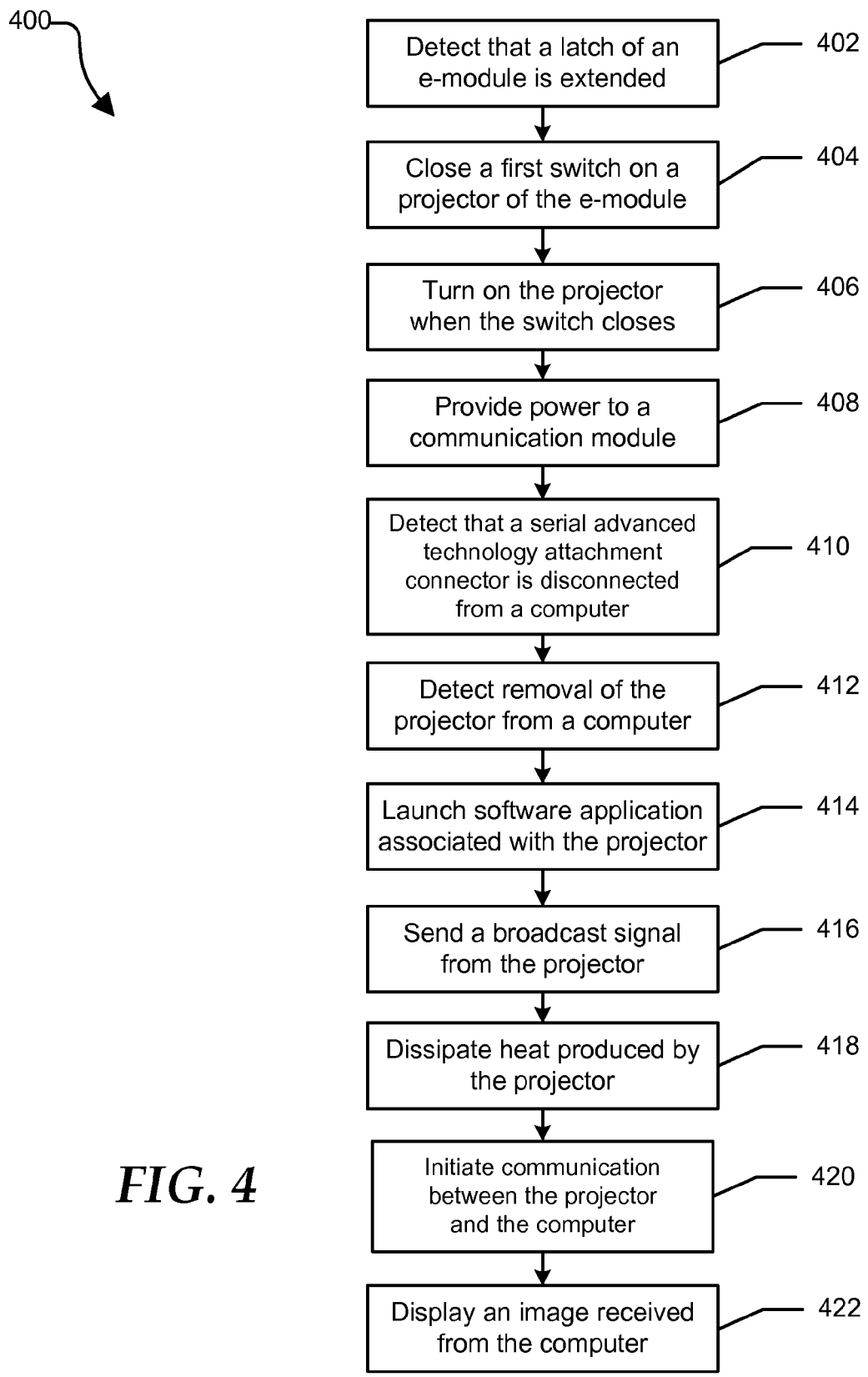
FIG. 4 is a flow diagram of a method for initiating communication between the computer and the integrated projector.

FIG. 4 shows a flow diagram of a method 400 for initiating communication between the computer and the integrated projector. At block 402, a latch of an e-module including the integrated projector is detected as extended. A first switch on the integrated projector is closed in response to the latch being extended at block 404. At block 406, the integrated projector is turned on when the switch closes. Power is provided to a communication module at block 408. The communication module can communicate via a WiFi communication link, a Bluetooth communication link, or the like. At block 410, disconnection of a SATA connector from the computer is detected.

At block 412, removal of the integrated projector is detected. The removal can be detected b when a SATA connector of the integrated projector is disconnected from a SATA connector of the computer. A software application associated with the integrated projector is launched when the integrated projector is removed from the computer at block 414. At block 416, a broadcast signal is sent from the integrated projector. Heat produced by the projector is dissipated at block 418. At block 420, communication is initiated between the integrated projector and the computer. An image received at the integrated projector from the computer is displayed at block 422.

Figure 5:
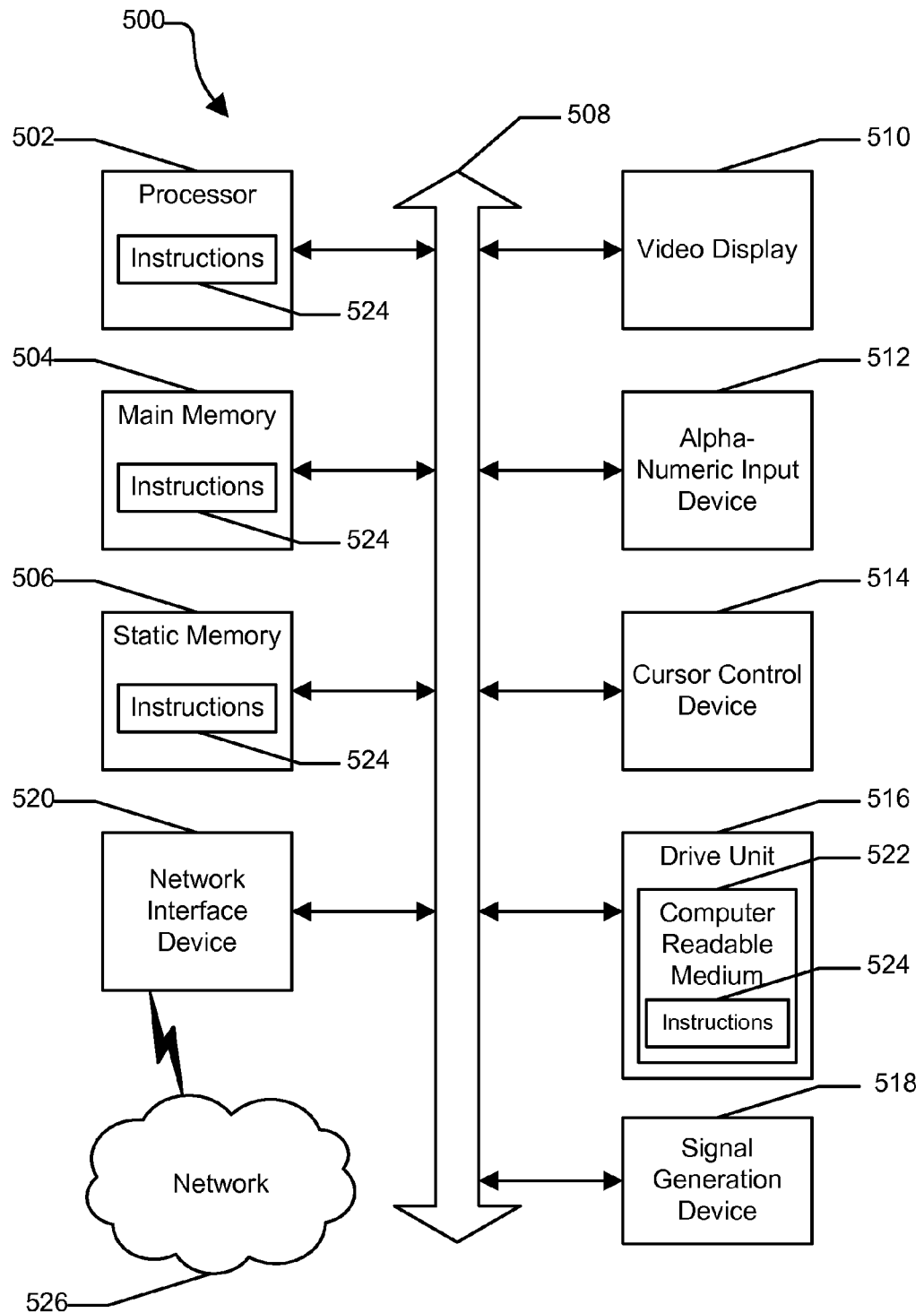
FIG. 5 is a block diagram of a general computer system.

FIG. 5 shows an illustrative embodiment of a general computer system 500 in accordance with at least one embodiment of the present disclosure. The computer system 500 can include a set of instructions that can be executed to cause the computer system to perform any one or more of the methods or computer based functions disclosed herein. The computer system 500 may operate as a standalone device or may be connected such as using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

The computer system 500 may include a processor 502 such as a central processing unit (CPU), a graphics processing unit (GPU), or both. Moreover, the computer system 500 can include a main memory 504 and a static memory 506 that can communicate with each other via a bus 508. As shown, the computer system 500 may further include a video display unit 510, such as a liquid crystal display (LCD), an organic light emitting diode (OLED), a flat panel display, a solid state display, or a cathode ray tube (CRT). Additionally, the computer system 500 may include an input device 512, such as a keyboard, and a cursor control device 514, such as a mouse. The computer system 500 can also include a disk drive unit 516, a signal generation device 518, such as a speaker or remote control, and a network interface device 520.

In a particular embodiment, as depicted in FIG. 5, the disk drive unit 516 may include a computer-readable medium 522 in which one or more sets of instructions 524 such as software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media. The network interface device 520 can provide connectivity to a network 526, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal, so that a device connected to a network 526 can communicate voice, video or data over the network 526. Further, the instructions 524 may be transmitted or received over the network 526 via the network interface device 520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A projector comprising:
a first serial advanced technology attachment connector configured to connect with a second serial advanced technology attachment connector located within a computer;
a latch configured to extend from the projector and to disconnect the first serial advanced technology attachment connector from the second serial advanced technology attachment connector in response to the latch being extended from the projector, wherein the projector is removed from within the computer in response to the latch being pulled;
a switch in communication with the latch, the switch configured to close in response to the latch being extended, and to electrically couple a communication module and a radio link to a battery within the projector in response to the switch being closed;
the communication module in communication with the switch and with the first serial advanced technology attachment connector, the communication module configured to receive power along with the radio link from the battery in response to the switch is closed, to initiate communication with the computer via the radio link, to receive an image from the computer, and to display the image; and
a cover being made of a material that conducts heat in physical communication with a heat sink of the projector, the cover configured to enhance heat dissipation of the heat sink to remove heat produced by the communication module based on the cover being in physical communication with the heat sink and the produced heat being dissipated within a large surface area of the cover and flow of ambient air over the cover.

2. The projector of claim 1 further comprising:
a communication cover in physical communication with the radio link, the communication cover configured to enable the communication between the communication module and the computer.

3. The projector of claim 1 wherein the communication module is further configured to detect when the serial advanced technology attachment is disconnected from the computer.

4. The projector of claim 1 wherein the communication with the computer is through Wireless-Fidelity communication.

5. The projector of claim 1 wherein the communication with the computer is through Bluetooth communication.

6. A system comprising:
a computer including:
a first serial advanced technology attachment connector; and
a projector including:
a second serial advanced technology attachment connector configured to connect with the first serial advanced technology attachment connector located within the computer;

a latch configured to extend from the projector and to disconnect the second serial advanced technology attachment connector from the first serial advanced technology attachment connector in response to the latch being extended from the projector, wherein the projector is removed from within the computer in response to the latch being pulled;

a switch in communication with the latch, the switch configured to close in response to the latch being extended, and to electrically couple a communication module and a radio link to a battery within the projector in response to the switch being closed;

the communication module in communication with the switch and with the first serial advanced technology attachment connector, the communication module configured to receive power along with the radio link from the battery in response to the switch is closed, to initiate communication with the computer via the radio link, to receive an image from the computer, and to display the image; and a cover being made of a material that conducts heat in physical communication with a heat sink of the projector, the cover configured to enhance heat dissipation of the heat sink to remove heat produced by the communication module based on the cover being in physical communication with the heat sink and the produced heat being dissipated within a large surface area of the cover and flow of ambient air over the cover.

7. The system of claim 6 wherein the projector further comprises:
a communication cover in physical communication with the radio link, the communication cover configured to enable the communication between the communication module and the computer.

8. The system of claim 6 wherein the communication module is further configured to detect when the serial advanced technology attachment is disconnected from the computer.

9. The system of claim 6 wherein the communication with the computer is through Wireless-Fidelity communication.

10. The system of claim 6 wherein the communication with the computer is through Bluetooth communication.

11. A method comprising:
releasing a latch from being held within an integrated projector;
extending the latch from within the integrated projector;
detecting that the latch of the integrated projector is extended from the integrated projector;
providing a signal to a first switch in response to detecting that the latch is extended, wherein the first switch is internal to the integrated projector;
closing the first switch in response to receiving the signal;
turning on the integrated projector when the first switch is closed;
providing power from a voltage reference within the integrated projector to a communication module and to a radio link of the integrated projector when the first switch is closed;
detecting that the integrated projector is removed from a computer;
initiating display software on the integrated projector in response to detecting that the integrated projector is removed from the computer;
initiating communication between the communication module of the integrated projector and the computer via the radio link in response to detecting that the integrated projector is removed from the computer;
displaying an image received from the computer; and
dissipating heat produced by the integrated projector via a cover of the integrated projector based on the cover being made of a material that conducts heat being in physical communication with a heat sink of the integrated projector and the produced heat being dissipated within a large surface area of the cover and flow of ambient air over the cover.

12. The method of claim 11 wherein detecting that the integrated projector is removed from the computer further comprises:
detecting that a serial advance technology attachment connector is disconnected from the computer.

13. The method of claim 11 wherein displaying the image received from the computer further comprises:
projecting the image from a lens of the integrated projector.

14. The method of claim 11 wherein the communication with the computer is through Wireless-Fidelity communication.

15. The method of claim 11 wherein the communication with the computer is through Bluetooth communication.

* * * * *